United States Patent

Guzak, Jr.

[15] 3,648,247

[45] Mar. 7, 1972

[54] DATA HANDLING SYSTEM

[72] Inventor: John Guzak, Jr., Arlington Heights, Ill.

[73] Assignee: SCM Corporation, New York, N.Y.

[22] Filed: Apr. 22, 1970

[21] Appl. No.: 30,632

[52] U.S. Cl. .......... 340/172.5

[51] Int. Cl. .......... G11c 9/00, G06f 5/04

[58] Field of Search .......... 340/172.5

[56] References Cited

UNITED STATES PATENTS

| | | | |
|---|---|---|---|
| 3,302,180 | 1/1967 | Donohoe et al. | 340/172.5 |
| 3,340,514 | 9/1967 | Swift | 340/172.5 |
| 3,345,617 | 10/1967 | Cox, Jr. et al. | 340/172.5 |
| 3,362,014 | 1/1968 | Hauck | 340/172.5 |
| 3,369,223 | 2/1968 | Dryden | 340/172.5 |
| 3,408,629 | 10/1968 | Haselwood | 340/172.5 |
| 3,434,117 | 3/1969 | Gibson et al. | 340/172.5 |
| 3,454,930 | 7/1969 | Schoeneman | 340/172.5 |
| 3,470,539 | 9/1969 | Proud, Jr. et al. | 340/172.5 |
| 3,500,330 | 3/1970 | Hertz | 340/172.5 |

*Primary Examiner*—Paul J. Henon
*Assistant Examiner*—Paul R. Woods
*Attorney*—Mason, Kolehmainen, Rathburn & Wyss

[57] ABSTRACT

A system for transferring successive data units from a record reader to a data processor includes a buffer which is coupled between the reader and the processor and which has a plurality of individually addressable stages each adapted to store a single data unit. One counter addresses the storage elements to receive successive input data units and maintains a running count of the number, while a second counter does the same for withdrawn data units. A logic circuit controlled by the two counters establishes the difference between the number of data units supplied and withdrawn and continuously varies the speed of the record reader in an attempt to maintain the system in continuous operation. As an example, the reader speed is increased when the difference between supplied and withdrawn data units is decreased, and reader speed is decreased when the difference is increased, thereby to avoid either emptying or filling the buffer.

13 Claims, 2 Drawing Figures

Figure 1:
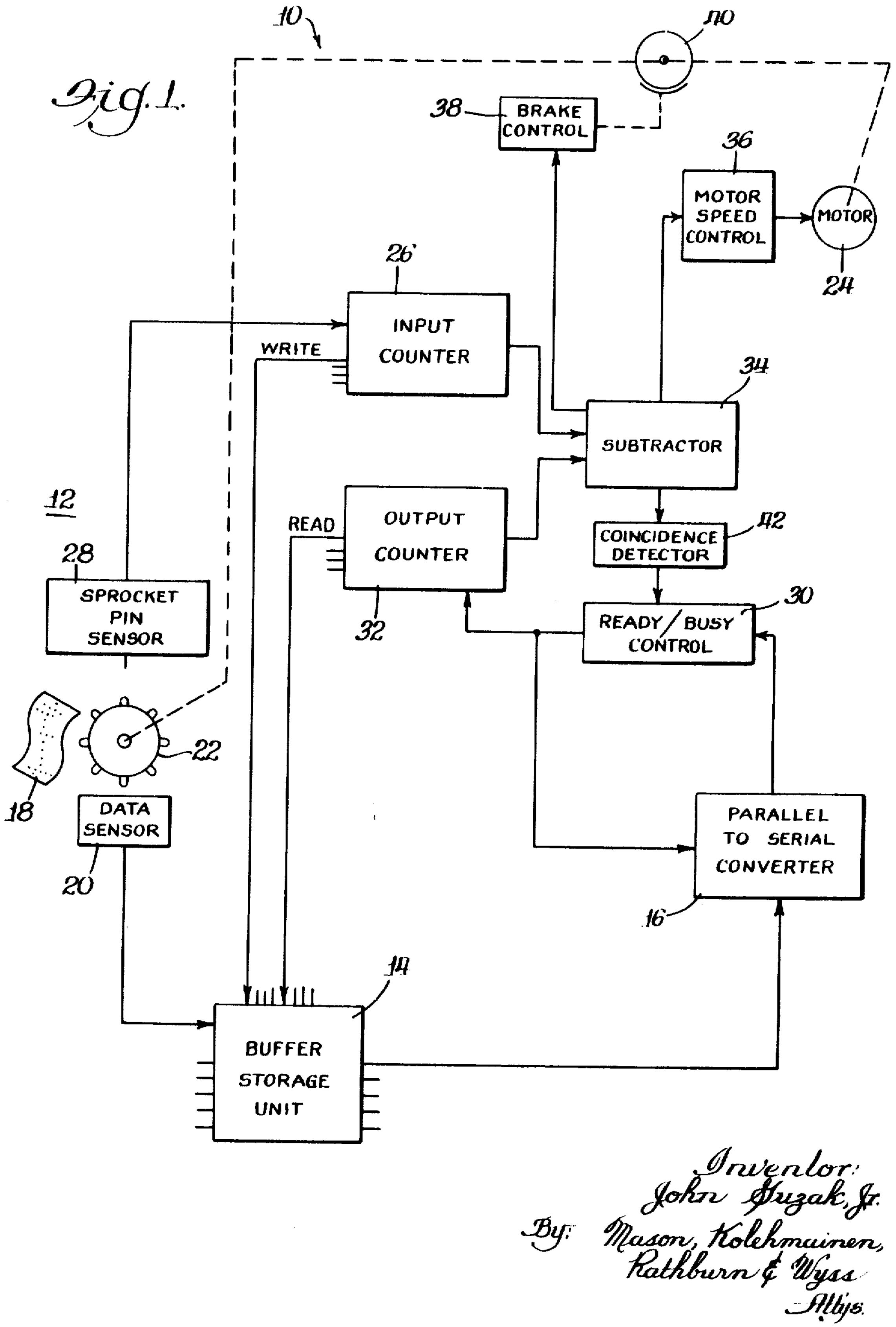

Inventor:
John Suzak, Jr.
By: Mason, Kolehmainen, Rathburn & Wyss
Attys.

Inventor:
John Suzuk, Jr.
By: Mason, Kolehmainen, Rathburn & Wyss
Attys.

DATA HANDLING SYSTEM

This invention relates to a data-handling system and, more particularly, to such a system for controlling the rate of transfer of data between a data source and a data utilization means so as to obtain optimum system efficiency.

The problem of realizing optimum circuit and component utilization is frequently encountered in data-handling systems in which data is supplied and utilized in an asynchronous relation or where the data source and utilizing means have different operating or processing speeds. As an example, the speed at which data can be derived and placed in buffer storage is often quite different from the speed at which data can be withdrawn from storage and used or processed. In one prior system described in U.S. Pat. No. 3,302,180 where input data items derived from a moving magnetic record are transferred to a data processor through a buffer storage, counters are provided for counting data units into and out of the buffer storage unit. In an attempt to optimize system performance, these input and output counts are compared and used to stop the record reader when the buffer storage unit is full and to start the reader when the buffer storage unit is empty.

This approach is, however, subject to some disadvantages. In the first place, the advantage of being able to run the reader at full speed until the buffer is filled is at least partially vitiated by the problems inherent in starting and stopping a record drive system including components of significant mass and inertia. These arrangements require additional circuitry to compensate for record "overshoot" and frequently present time delays in system response.

Accordingly, one object of the present invention is to provide an improved system for transferring data from a source to the utilizing means through a transfer means.

Another object is to provide a system for maintaining, to the greatest extent possible, a continuous flow of data from a source to a utilizing means or processor while avoiding intermittent or start-stop operation.

A further object is to provide a data-handling system of the type including a buffer register in which the speed at which data is supplied to the buffer is controlled in accordance with the difference between the quantities of data supplied to and withdrawn from the buffer.

In accordance with these and many other objects, an embodiment of the invention comprises a data-handling system including a data source for supplying data to a data processor through an intervening transfer or buffer storage means. In one embodiment the system comprises a record reader used in telegraphic signalling systems for supplying input data which is transferred through a multiple stage buffer storage unit to a parallel-to-serial converter, the output of which can be coupled to a signalling line or channel. The buffer storage unit includes a plurality of character storing stages individually addressable for input and output. A first counter which is advanced step by step for each character derived from the record reader steers successive characters to successive stages of the buffer storage unit and also maintains a running count of the number of characters supplied from the reader to the buffer storage unit. A second counter sequentially addresses buffer storage stages to withdraw data from the storage unit for transfer to the parallel-to-serial converter and maintains a running count of characters withdrawn from the buffer storage. The input and output counters also control a logic circuit which maintains a continuous indication of the difference between the supplied and withdrawn characters. This difference is used to vary the speed of the record reader so as to match the speed at which data is supplied to the buffer to the speed at which data is removed from the buffer by the processing unit so that the buffer will not be filled or emptied to necessitate start-stop operation of the reader. As an example, if the difference between the quantity of data supplied to the buffer and the quantity of data removed from the buffer becomes small, thereby indicating that the processor is "catching up" with the reader, the speed of the record reader is increased. Alternatively, if the difference becomes large, thereby indicating the buffer is beginning to be filled with unprocessed data, the speed of the record reader is decreased.

Figure 2:
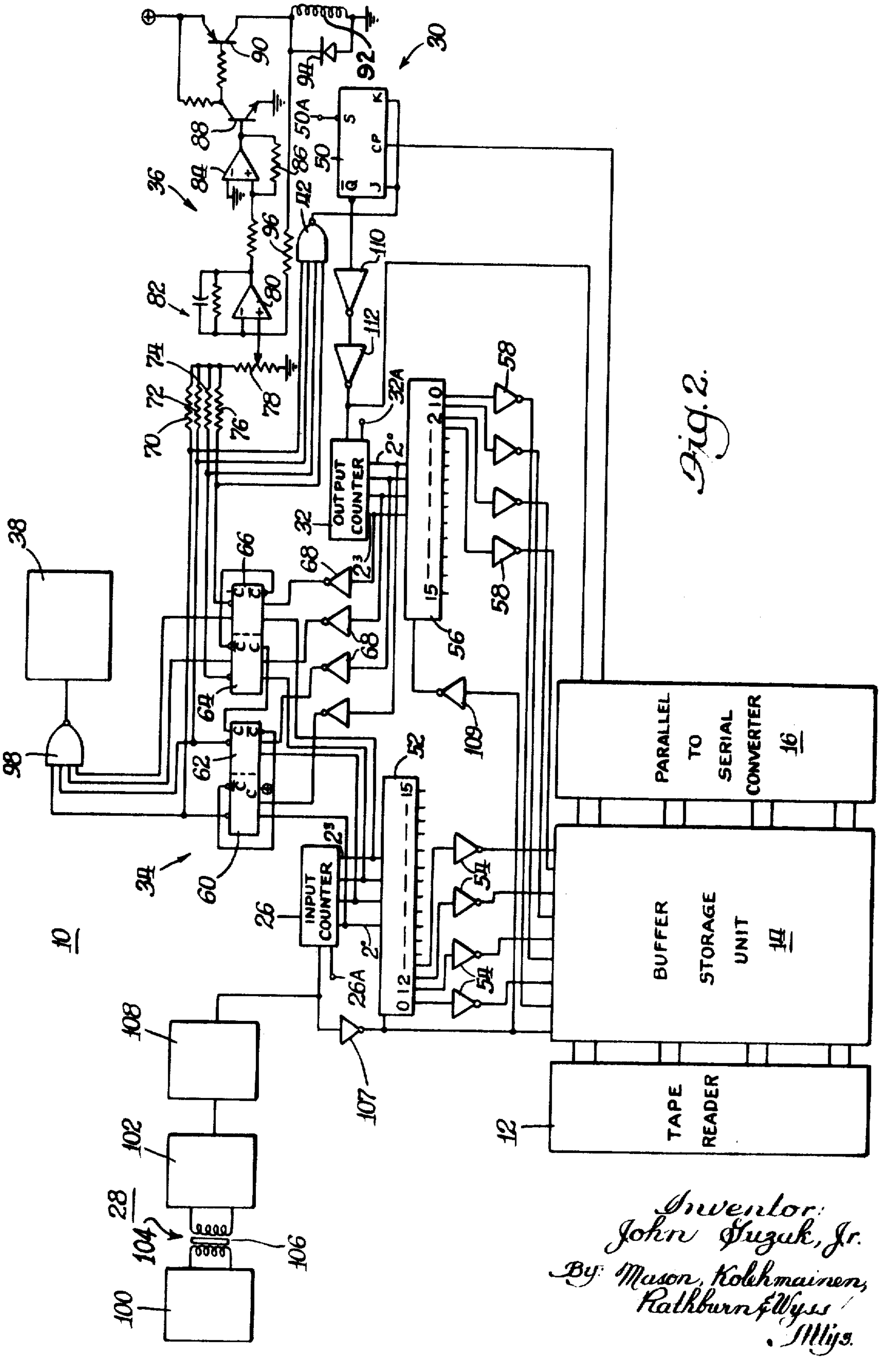

Many other objects and advantages of the present invention will become apparent from considering the following detailed description in conjunction with the drawings in which:

FIG. 1 is a schematic diagram in block form of a data-handling system embodying the present invention; and FIG. 2 is a schematic diagram in logic symbol form illustrating the data-handling system shown in FIG. 1.

Referring now more specifically to FIG. 1 of the drawings, therein as illustrated a data-handling system which is indicated generally as 10 and which embodies the present invention. The system 10 includes a record reader or data source indicated generally as 12 supplying input data which is transferred through a buffer storage unit 14 to a data processor or utilizing device such as a parallel-to-serial converter 16. The buffer storage unit 14 includes a plurality of individual stages each adapted to store a single input data unit, commonly a single character expressed in suitable code such as Baudot or ASCII. Each of the individual storage stages or elements in the buffer storage unit 14 is individually addressable, both for input and output.

The system 10, in accordance with the present invention, affords means for obtaining, to the greatest possible extent, a continuous transmission of data from the reader 12 to the parallel-to-serial converter 16 through the buffer storage unit 14 so as to avoid intermittent or start-stop operation.

The record reader 12 includes an elongated record medium or perforated tape 18 containing data. The record 18 is advanced relative to a record reader or data sensor 20 by a suitable well-known drive such as a sprocket or pin wheel 22 driven by a motor 24. When the system 10 is placed in operation, the motor 24 is energized to rotate the pin wheel 22 and thus advance the elongated record 18 relative to the data sensor 20 which reads a single character from the tape 18 and forwards it for storage in the stage of the buffer storage unit 14 determined by the setting of or the address supplied by an input counter 26. The movement of the record 18 to present this character to the data sensor 20 is detected by a sprocket pin sensor 28, the output of which is coupled to the input of the input counter 26. This input signal advances the input counter 26 to its next setting in which the next stage in the buffer storage unit 14 to receive the next data unit is addressed. This step of advance of the input counter 26 also provides an indication that a single data unit or character has been stored in the buffer storage unit 14. During continuing rotation of the sprocket wheel 22, additional characters or data units are derived from the perforated tape 18 by the sensor 20 and supplied to successive stages in the buffer storage unit 14. During each of these read-in operations, the input counter 26 is advanced a single step to address the next stage in the buffer storage unit 14 and to provide an indication of the continuously increasing number of data units now stored in the buffer storage unit 14.

When the system 10 is placed in operation, a parallel-to-serial converter 16 supplies a signal to a ready/busy control 30 indicating that it is in a condition to accept the data unit or character from the buffer storage unit 14. The ready/busy control 30 supplies a strobe signal to the parallel-to-serial converter 16 to withdraw the character stored in the buffer storage unit 14 in the stage then addressed by the setting of an output counter 32. This normally is the stage in which is stored the first character derived from the record 18 by the data sensor 20. Thus, the first character derived from the record 18 is now transferred out of the buffer storage unit into the parallel-to-serial converter 16. The converter 16 applies an inhibit to the ready/busy control 30 until the processing of this character is completed. Incident to strobing the converter 16, the ready/busy control 30 supplies an input signal to the output counter 32 to advance the setting of this counter to one in which the stage containing the next character from the record 18 is addressed. This withdrawal of data units from the buffer storage unit 14 under the control of the output counter 32 continues in this manner, and the setting of the output counter 32 at any given time indicates the number of data units or characters withdrawn from storage in the buffer storage unit 14.

The outputs of the input and output counters 26 and 32 are supplied to a logic circuit providing a subtractor 34 which maintains a continuous indication of the difference between the number of data units supplied to the buffer storage unit 14 by the reader 12 and withdrawn from the buffer storage unit 14 by the parallel-to-serial converter 16. This difference signal is supplied to a motor speed control circuit 36 which varies the speed of the drive motor 24 in a manner such as to maintain the system 10 in continuous operation by matching the rate at which input data is supplied to the buffer storage unit 14 with the rate at which data is supplied to the buffer storage unit 14 with the rate at which data is withdrawn therefrom by the converter 16. If the data processing in the converter 16 is carried out at a fairly rapid rate of speed, the motor speed control circuit 36 is supplied with a signal representing a small difference between the number of supplied and withdrawn characters, and the speed of the motor 24 is increased. On the other hand, if the difference between the number of supplied and withdrawn characters increases, the speed of the motor 24 is reduced.

Even though the system 10 is designed to provide continuous data transfer through the buffer storage unit 14, extremely long processing operations or the occurrence of circuit abnormalities can abnormally increase the processing time of the converter 16 or require interruption in circuit operation. Accordingly, the circuit 10 includes a brake control 38 which normally maintains a brake 40 in an inoperative state. However, when the difference between data units supplied and withdrawn increases to a predetermined number approaching a filled condition of the buffer storage unit 14, the subtractor 34 controls the brake control 38 to apply the brake 40 and interrupt movement of the elongated record 18 past the data sensor 20. Since the sprocket feed wheel 22 is driven by the motor 24 through a slip clutch, the application of the brake 40 arrests further data input into the buffer storage unit 14. The system 10 also includes a coincidence detector 42 which is controlled by the subtractor 34 to provide an indication of when the number of data units supplied to and withdrawn from the buffer storage unit 14 is equal, thus indicating that the buffer storage unit is empty. When this condition arises as at the end of a message or transaction, the coincidence detector 42 applies an inhibit to the ready/busy control 30 to prevent any further attempts to read data out of the buffer storage unit 14 and to prevent any further advance in the setting of the output counter 32.

Referring now more specifically to FIG. 2 of the drawings, therein is illustrated, in logic symbol form, the system 10. The logic elements used in the system 10 and illustrated in symbolic form in FIG. 2 can be of any suitable well-known type such as DTL or TTL.

When the system 10 is placed in operation, a control circuit (not shown) applies a momentary resetting potential to three terminals 26A, 32A, and 50A to restore the input and output counters 26 and 32 to a normal condition and to set a JK flip-flop 50 to its set condition in which a more negative potential is provided at its $\overline{Q}$ output. The input counter 26 which can comprise a four stage counting ring includes four output leads $2^0$–$2^3$ which are coupled to the input of a decoding network 52. When the input counter 26 is reset, a low level potential is applied to its output leads which is decoded by the circuit 52 to select or address the stage of the buffer storage unit 14 in which is to be stored the first character or data unit derived from the record 18. As illustrated in FIG. 2, the decoder 52 is controlled by the input counter 26 to select in each successive setting of the counter 26 one of 16 output leads represented as "0," "1"–"15," inclusive. The outputs of the coding circuit 52 are connected to individual read-in or write enabling leads for individual stages of the buffer storage unit 14 through a plurality of drivers 54. With the input counter 26 in its "0" setting, it is assumed that the circuit 52 selects the first stage in the buffer storage unit 14 addressed as "0."

Similarly, the output counter 32 can comprise a four stage counting ring having four outputs indicated as $2^0$–$2^3$ to which low level output potentials are applied when this counter is reset by the application of the reset signal to the terminal 32A. The output leads from the output counter 32 are connected to a decoding network 56 which is identical to the decoder 52 and serves to address stages of the buffer storage unit 14 to enable the selective transfer of information from this stage in the unit 14 to the parallel-to-serial converter 16. The outputs of the decoding circuit 56 are coupled to the enabling leads extending to the buffer storage unit 14 through a plurality of drivers 58. With the output counter 32 in its reset stage, the decoding circuit selects the stage of the buffer storage unit 14 which is addressed as "0" and which is the stage that receives the first character or data unit supplied by the tape reader 12.

As set forth above, the subtractor 34 continuously indicates the difference between the input and output counters 26 and 32 to control the motor speed control circuit 36 so that the motor 24 in the tape or record reader 12 operates in dependence on the established difference. This control is so arranged that when a minimum difference exists, the speed of the motor 24 is the greatest. Since the two counters 26 and 32 have been reset to identical "0" settings, the difference between their settings is an absolute minimum when the system is placed in operation and the drive motor 24 is placed in its highest speed of operation. This causes input data to be transferred from the tape reader 12 to the buffer storage unit 14 at the highest possible speed when the system 10 is placed in operation.

More specifically, the subtractor 34 comprises four full adders 60, 62, 64, and 66 shown in two logic blocks. One add input to each of the adders 60, 62, 64, and 66 is connected to one of the output leads $2^0$–$2^3$ from the input counter 26 in corresponding lowest to highest order, respectively. The other add input to each of the adders 60, 62, 64, and 66 is connected to correspondingly ordered outputs $2^0$–$2^3$ from the output counter 32 through four inverters 68. Thus, the complement of the output from the counter 32 is applied to the input of the adders 60, 62, 64, and 66 so that these adders function as subtractors. The carry input to the lowest order adder 60 is strapped to a positive potential to provide a solid "1" input. Further, since the outputs of both of the counters 26 and 32 are at a low level or "0" and since the output of the counter 32 is inverted to provide a "1" input to these adders, the inverted outputs of all of the adders 60, 62, 64, and 66 shown by the circle connecting the logic block to the output lead is at a high potential, and the sum outputs of these adders are at a low potential.

To provide a control potential for controlling the motor speed control circuit 36, the inverted sum outputs from the four adders 60, 62, 64, and 66 are connected to a potentiometer 78 through four resistances 70, 72, 74, and 76 of decreasing value, respectively. Since the inverted sum outputs from the four adders are at a high potential, a maximum potential is supplied to the tap on the potentiometer 78 when the difference between the settings of the counters 26 and 32 is at a minimum. The control potential derived from the tap on the potentiometer 78 is used by the speed control circuit 36 to set the speed of operation of the motor 24. A higher potential derived from the potentiometer 78 controls the circuit 36 to effect a higher speed operation of the motor 24. A lower potential derived from the potentiometer 78 controls the circuit 36 to effect lower speed operation of the drive motor 24 for the tape reader 12.

The motor speed control circuit 36 includes an OP amp 80 with one input connected to the tap on the potentiometer 78 and another input terminal coupled to the output terminal of the amplifier 80 through an RC timing or integrating circuit indicated generally as 82 so that the amplifier 80 in conjunction with the network 82 operates as an integrator. The output of the amplifier 80 is coupled to one input of a second differential amplifier 84, the other terminal of which is returned to a point of reference potential such as ground. The output of the amplifier 84 is returned to the active input of this amplifier through a resistance element 86 so that the amplifier 84 operates as a Schmitt trigger. The output of the amplifier 84 is coupled through a transistor 88 to control conduction through a transistor 90 which is connected in series with an operating winding 92 for the drive motor 24, the winding 92 being shunted by a damping diode 94. The collector of the transistor 90 or its point of connection to the winding 92 is also returned through a resistance element 96 to one input of the amplifier 80 to provide a feedback of a voltage proportional to motor speed.

When the high input potential derived from the potentiometer 78 is applied to the connected terminal of the amplifier 80, the output of this amplifier rises and triggers the amplifier 84 into a highly conductive condition to place the transistor 88 in a nonconductive state. This places the transistor 90 in a conductive condition and applies full energization to the winding 92 of the direct current motor 24. This potential is returned and placed across the timing circuit 82 in which it is integrated so that after a period of time the amplifier 80 drops to place the amplifier 84 in a nonconductive state. This places the transistor 88 in a conductive condition and interrupts current flow through the transistor 90 to momentarily terminate the energization of the winding 92. In dependence on the level of the potential provided by the potentiometer 78 and the time constant of the network 82, the amplifier 80 becomes unbalanced and again controls the amplifier 84 and the transistor 88 to return the transistor 90 to a conductive condition to reestablish the energizing circuit for the winding 92. The duration of time required to unbalance the differential amplifier 80 is dependent on the potential supplied by the potential 78 and varies the on-off duty cycle of the transistor 90, thereby effecting speed regulation of the motor 24. A higher potential supplied by the potentiometer 78 increases the ratio of "on" and "off" time and operates the direct current motor 24 at a higher speed. The reduction in this ratio arising from lower potentials supplied by the potentiometer 78 increases the "off" time and reduces the speed of operation of the motor 24.

To permit operation of the sprocket wheel 22 by the drive motor 24, it is necessary that the brake 40 be released. The brake 40 is, as set forth above, controlled by the brake control circuit 38 which is of any of the number of well-known constructions. The input to the brake control circuit 38 is controlled by a NAND-gate 98, the inputs to which are connected to a combination of direct and inverted sum outputs from the adders 60, 62, 64, and 66. When the input counters 26 and 32 are set to coincident settings, at least one input to the gate 98 is inhibited so that the more positive output from this gate controls the circuit 38 to release the brake 40, thereby permitting movement of the sprocket wheel 22 by the motor 24.

When the sprocket wheel 22 is rotated by the motor 24, the perforated tape 18 is advanced relative to the data sensor 20, and the first data unit or character is reproduced thereby and stored in the first storage element or stage of the buffer storage unit 14 addressed as "0" by the current setting of the input counter 26. Incident to this movement, the sprocket pin sensor 28 senses this fact and supplies an input pulse to the input counter 26 to advance this counter to its next setting so that the next character reproduced from the tape 18 is supplied to the next stage of the buffer storage unit 14.

Although the sprocket pin sensor 28 can be any of a number of well-known circuits, it is illustrated in FIG. 2 of the drawings as comprising a source of oscillatory energy or an oscillator 100, the output of which is coupled to the input of an integrator circuit 102 by an inductive coupling indicated generally as 104 having a movable magnetic core 106 which is mechanically coupled to or actuated by the pins or teeth on the wheel 22. A shift in the position of the core 106 varies the coupling between the oscillator 100 and the integrator 102, and the integrator output drives a Schmitt trigger 108 to provide a negative-going output pulse. This negative-going signal, either as generated or with shaping, is forwarded through an inverter 107 to strobe the input data from the tape reader 12 into the buffer storage unit 14 and to complete the enabling of the addressing in the decoder 52. This signal is applied through another inverter 109 to the output decoder 56 to inhibit any change in the output addressing during read-in to the buffer 14. The trailing edge of the negative-going input from the circuit 108 advances the counter 26 a single step so that a more positive potential is now applied to the output $2^0$, the remaining outputs remaining at the lower potential.

The decoding network 52 responds to this change in input condition to disable the first stage addressed as "0" in which is stored the first reproduced character and to enable the next stage in the buffer storage unit 14 addressed as "1." Further, the more positive potential applied to the output $2^0$ from the input counter 26 provides an additional high level input to the lowest order adder 60 and changes the output from this adder so that the inverted sum output drops to a low level potential. This removes the potential supplied through the resistance element 70 to the potentiometer 78 and thus reduces the control potential supplied to the speed control circuit 36 to reduce the speed of the motor 24. Since the resistance element 70 is the highest value of the four resistors 70, 72, 74, and 76, the loss of energization resulting from the change in the state of the lowest ordered adder 60 produces the smallest change in the speed of the motor 24.

When the next character is derived from the perforated tape 18 by the tape reader 12 and supplied to the second stage addressed as "1" in the buffer storage unit, the sprocket pin sensor 28 advances the input counter 26 to its next state to couple the output of the tape reader 12 to the next stage in the buffer storage unit 14 under the control of the decoder 52. In this next stage, the output $2^0$ from the counter 26 drops to a low potential, and the next highest ordered output $2^1$ rises to a more positive potential. This controls the two adders 60 and 62 so that a more positive potential is applied to the inverted sum output from the adder 60 and a low level potential is supplied at the inverted sum output from the adder 62. This effectively returns the resistor 70 to an effective state and removes the resistor 72. Because of the relative values of the resistances 70, 72, 74, and 76 set forth above, the removal of the resistance element 72 produces another incremental drop in the potential supplied by the potentiometer 78 and a corresponding further reduction in the speed of the operation of the motor 24.

This operation continues during the advance of the tape 18 past the data sensor 20 in the manner described above with the input counter 26 being advanced a single step in response to each data unit or character supplied to the buffer storage unit 14. As more characters are supplied from the tape reader 12 to the buffer storage unit 14, the difference established by the four adders 60, 62, 64, and 66 in the subtractor 34 becomes progressively larger so that the combination of the resistance elements 70, 72, 74, and 76 changes to progressively decrease the potential supplied by the potentiometer 78 to the speed control circuit 36. Thus, the drive motor 24 operates at lower and lower speeds as a greater number of characters are stored in the buffer storage unit 14.

As set forth above, data units or characters are transferred from the buffer storage unit 14 to the parallel-to-serial converter 16 under the control of the output counter 32 and the ready/busy control 30. Further, when there is coincidence between the setting of the input counter 26 and the output counter 32, the inverted sum outputs from the four adders 60, 62, 64, and 66 are all at a more positive potential, and a coincidence detecting gate 42 is fully enabled so that a more negative potential is applied to the J and K inputs of the flip-flop 50, thereby inhibiting switching of this flip-flop. However, as soon as a single bit is stored in the buffer storage unit 14, one of the inverted sum outputs from the adders is at a more negative potential, and the output of the coincidence gate 42 rises to a more positive potential so that the flip-flop 50 is clocked to alternate potential so that the flip-flop 50 is clocked to alternate stable conductive states by signals applied to its clock pulse input CP. Further, flip-flop 50 was primed by the reset signal supplied to the terminals 50A in the manner described above so that a more negative potential is supplied to its $\bar{Q}$ output. This signal is forwarded through a pair of inverters 110 and 112 to the input of the parallel-to-serial converter 16. This enables the converter to receive the character supplied by the stage addressed by the output counter 32. Accordingly, when a character is stored in the first stage addressed as "0" by the counter 32 and the decoder 56, this character is supplied to the converter 16 and utilized. A common application in telegraphic communication systems is to convert this character presented in parallel form to serial form for transmission over a signalling channel. When the transmission of this character or the processing of this first character derived from the first stage of the buffer storage unit 14 is completed, the parallel-to-serial converter 16 supplies a negative-going pulse to the CP terminal of the flip-flop to operate this flip-flop to its alternate state so that a more positive potential is supplied at the $\bar{Q}$ terminal. This signal is forwarded through the two inverters 110 and 112 to provide a positive-going pulse to the input of the counter 32 to advance this counter to its next setting in which the output $2^0$ becomes more positive with the remaining outputs remaining at their low level.

This controls the decoder 56 to remove the address enabling signal supplied through the inverter 58 to the buffer stage addressed as "0" and supply a readout enabling potential to the next buffer stage addressed as "1." Thus, the parallel-to-serial converter 16 is now enabled to receive the second character reproduced from the tape 18. In addition, a more positive potential applied to the output $2^0$ from the counter 32 is forwarded through the connected inverter 68 to provide a low input to one of the add inputs to the lowest ordered adder 60. This has the effect of reducing the difference between the number of characters supplied to and withdrawn from the buffer storage unit 14 by an increment of one, and thus increases the speed of the motor 24 by an increment.

The more positive potentials supplied by the inverter 112 to the output counter 32 is also forwarded to the parallel-to-serial converter 16 to advise this data processing unit that a new stage in the storage unit 14 is being addressed. After a time delay sufficient to ensure stability, the parallel-to-serial converter 16 supplies another clock pulse to the flip-flop 50 to change its state and drop the potential at the $\bar{Q}$ terminal to its lower level. This terminates the count pulse supplied the output counter 32 and advises the parallel-to-serial converter 16 that the next character is to be transferred in the buffer storage unit 14 to the converter 16. If desired, this negative-going signal at the output of the inverter 112 can be used to strobe the transfer of data from the buffer storage unit 14 to the converter 16 using known wave shaping and delay circuitry.

This operation involving the asynchronous transmission of successive data units from the tape reader 12 to the buffer storage unit 14 and the withdrawal of data units from the buffer storage unit 14 to the processor or converter 16 continues in the manner described above. During this operation the speed of the motor 24 varies in dependence upon the difference established by the subtractor 34 between the number of characters derived from the tape 18 and supplied to the buffer storage unit 14 and the number of characters withdrawn from the buffer storage unit 14 and supplied to the converter 16.

In the event that the difference established by the subtractor 34 becomes too great and indicates that there is a possibility that the data supplied by the tape reader 12 will overrun the storage capacity of the buffer storage unit 14, the brake 40 is applied by the brake control circuit 38 to prevent further data input operations. This control is exercised by the gate 98, the inputs of which are connected to the inverted sum outputs of the adders 60 and 62 and the sum outputs of the adders 64 and 66. Thus, the gate 98 is fully enabled whenever the difference between the number of input characters and the number of characters withdrawn from the buffer storage unit equals twelve. When the gate 98 is fully enabled, the control circuit 38 is operated to apply the brake 40 and prevent further data input. When, however, the outputting operation to the converter 16 reduces the number of characters in storage below twelve, an inhibiting signal is applied to at least one of the inputs of the gate 98 and the brake 40 is released to initiate operation of the tape reader 12.

Whenever the number of characters withdrawn from the buffer storage unit 14 for processing by the converter 16 equals the number of characters supplied to the buffer storage unit 14 from the tape reader 12, the difference established by the subtractor is reduced to zero, and all of the inverted sum outputs from the four adders 60, 62, 64, and 66 will be at a more positive potential regardless of the settings of the input and output counters 26 and 32. These positive potentials fully enable the coincidence detector 42 so that its output drops to a more negative potential which is applied to both of the inputs to the flip-flop 50. This inhibits further output operations and a further advance in the setting of the output counter 32 until an additional input is supplied to the input counter 26 representing an additional character supplied from the tape reader 12 to the buffer storage unit 14. Thus, it should be noted that there is no need to restore the input and output counters 26 and 32 to a normal setting whenever the buffer storage unit 14 is emptied and that the drive motor 24 will operate at full speed as long as the system 10 is maintained in operation until additional data is supplied from the tape reader 12 to the buffer storage unit 14. At this time, the system 10 operates in the manner described above to supply data to the buffer storage unit 14 at a speed dependent on the speed at which data is withdrawn therefrom and processed.

Although the present invention has been described with reference to a data-handling system in which the speed at which data is supplied from the source to the utilizing means through an intermediate transfer means, the difference established by the subtractor 34 could as well be used in an arrangement in which data is supplied from the source on demand or at an internally determined rate and the speed at which data is withdrawn from the buffer storage or transfer means is controlled in dependence on the difference between the data units.

What is claimed and desired to be secured by Letters Patent of the United States is:

1. A data-handling system comprising
 a data-handling means including a data source for supplying units of data and a data utilizing means for withdrawing units of data,
 a record device included in one of the data source or data utilizing means and using an elongated record,
 a variable speed drive means for producing relative movement between the elongated record and the record device, said variable speed drive means providing continuous adjustment over the speed of relative movement between the record and the record device,
 control means controlled by the data source and the data utilizing means and operable to establish the difference between the number of supplied and withdrawn data units,
 and a speed control circuit coupled to the drive means and the control means and controlled by the control means for continuously varying the speed of the drive means in accordance with the different established differences between the numbers of supplied and withdrawn data units.

2. A system for handling data recorded on an elongated record comprising
 a record transducer for reproducing units of data from the record,
 a variable speed drive means for producing relative movement between the record and the transducer, storage means having an input supplied with data from the transducer and an output, said storage means being capable of storing different numbers of units of data, detecting means controlled by the number of units of data in the storage means, and a speed control circuit coupled to the drive means and controlled by the detecting means for continuously varying the speed of the drive means in accordance with the number of units of data in the storage means while maintaining the drive means in operation.

3. The system set forth in claim 2 including stop means controlled by the detecting means for arresting operation of the drive means when the number of units in the storage means reaches a given value.

4. A system for handling data recorded on an elongated record comprising a record transducer for reproducing successive units of data from the record, a variable speed drive means for producing relative movement between the record and the transducer, storage means for storing more than one unit of data and having both an input supplied with data from the transducer and an output, the data supplied to the input of said storage means being transferred through the storage means to the output so that the storage means contains different numbers of units of data, control means including counting means for counting the number of units of data supplied to the input and the output of the storage means and for establishing the numerical difference therebetween, and a speed control circuit coupled to the drive means and the control means and controlled by the numerical difference between the number of units of data supplied to the input and the output for varying the speed of the drive means to different values in accordance with the different numerical differences while maintaining the drive means in operation.

5. A system for transferring units of data comprising a data source for supplying successive units of data, a data utilizing means for using successively supplied units of data, data transfer means coupled between the data source and the data utilizing means for transferring data from the data source to the data utilizing means, said data transfer means including means providing the temporary storage of more than one unit of data, control means responsive to the number of data units supplied to the input of the transfer means and the number of data units transferred to the output of the transfer means for determining the difference therebetween, said control means including means for establishing different magnitude potentials corresponding to said difference, and means coupled to the control means and responsive to the different magnitude potentials for controlling the transfer of data through the data transfer means in accordance with said difference.

6. The system set forth in claim 5 in which the control means includes a pair of counting means for counting data units supplied to the input and transferred to the output of the transfer means, and a subtractor circuit coupled to the counting means for determining the difference.

7. The system set forth in claim 6 in which the control means also includes a plural element network coupled to the subtractor circuit for establishing the different magnitude potentials.

8. The system set forth in claim 5 in which one of the data source and data utilizing means includes a record and a variable speed record drive means whose speed is controlled in accordance with the different magnitude potentials.

9. The system set forth in claim 8 including stop means for arresting movement of the record, and means controlled by said control means for operating said stop means.

10. A data-handling system for transferring units of data comprising a data source for supplying successive input units of data, storage means having separate and individually addressed storage elements for storing different data units, said storage means having an input for receiving data units from the data source and an output from which data units are withdrawn, first counting means for counting the number of data units supplied from the data source to the storage means and coupled to the storage means for addressing the storage elements to receive successive data units, data utilizing means coupled to the output of the storage means, second counting means for counting the number of data units withdrawn from the storage means and coupled to the storage means for addressing the storage elements from which data units are transferred to the data utilizing means, logic circuit means controlled by the first and second counters for establishing the difference between the number of data units supplied to and withdrawn from the storage means, said logic circuit means including means for providing an output signal continuously varying in accordance with the established difference, and means coupled to the logic circuit means and controlled by said output signal for continuously regulating the flow of data units through the storage means.

11. A data-handling system for transferring units of data comprising a data source for supplying successive input units of data, speed control means for varying the speed at which the successive units of data are supplied, storage means having separate and individually addressed storage elements for storing different data units, said storage means having an input for receiving data units from the data source and an output from which data units are withdrawn, first counting means for counting the number of data units supplied from the data source to the storage means and coupled to the storage means for addressing the storage elements to receive successive data units, data utilizing means coupled to the output of the storage means, second counting means for counting the number of data units withdrawn from the storage means and coupled to the storage means for addressing the storage elements from which data units are transferred to the data utilizing means, and logic circuit means controlled by the first and second counters and coupled to the speed control means for establishing the difference between the number of data units supplied to and withdrawn from the storage means and for controlling the speed control means to vary the speed at which data units are supplied to the storage means in accordance with the difference.

12. The data-handling system set forth in claim 11 including circuit means controlled by the logic circuit means for selectively inhibiting the transfer of data from the storage means to the data utilizing means in accordance with the established difference.

13. A method of controlling the flow of data from a data source to a data utilizing means through a data transfer unit wherein either the data source or the data utilizing means possesses a variable speed characteristic, which method comprises the steps of supplying data from the source to the transfer means, asynchronously withdrawing data from the transfer means for the data utilizing means, continuously determining the difference between the quantity of data supplied to and withdrawn from the transfer means, and continuously varying the speed at which data is supplied by the data source or withdrawn by the data utilizing means in accordance with the continuously determined difference so as to prevent, to the extent possible, any interruption in both the supply of data to and the withdrawal of data from the transfer means.

* * * * *